United States Patent
Gregg et al.

(10) Patent No.: US 6,966,062 B2
(45) Date of Patent: Nov. 15, 2005

(54) METHOD AND APPARATUS FOR ALLOCATING USE OF AN ACCESS DEVICE BETWEEN HOST AND GUEST OPERATING SYSTEMS

(75) Inventors: Leon Edward Gregg, Rochester, MN (US); Daniel Joseph Strauss, Rochester, MN (US); Andrew Thomas Tauferner, Rochester, MN (US); James Lawrence Tilbury, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 09/839,483

(22) Filed: Apr. 20, 2001

(65) Prior Publication Data

US 2002/0156934 A1 Oct. 24, 2002

(51) Int. Cl.[7] ................................ G06F 9/46
(52) U.S. Cl. ...................... 718/104; 719/319
(58) Field of Search ................. 718/100–104; 711/151; 710/240; 709/213; 719/319

(56) References Cited

U.S. PATENT DOCUMENTS

| | | | | |
|---|---|---|---|---|
| 4,354,227 A | * | 10/1982 | Hays et al. ................ | 710/240 |
| 5,138,713 A | * | 8/1992 | Loten ........................ | 718/104 |
| 5,471,609 A | * | 11/1995 | Yudenfriend et al. ....... | 714/4 |
| 6,131,113 A | * | 10/2000 | Ellsworth et al. .......... | 709/213 |
| 6,253,225 B1 | * | 6/2001 | Nakahara et al. .......... | 718/100 |
| 6,401,110 B1 | * | 6/2002 | Freitas et al. .............. | 718/104 |
| 6,453,392 B1 | * | 9/2002 | Flynn, Jr. ................... | 711/151 |
| 6,711,605 B2 | * | 3/2004 | Sekiguchi et al. .......... | 718/100 |

\* cited by examiner

*Primary Examiner*—St. John Courtenay, III
*Assistant Examiner*—Van Nguyen
(74) *Attorney, Agent, or Firm*—Moser, Patterson & Sheridan, LLP.

(57) ABSTRACT

A method, apparatus and article of manufacture for allocating use of an access device between a host operating system and a guest operating system. In one embodiment, a source of the received request to use the access device is determined as either the host operating system or the guest operating system. A determination of whether the host or guest operating system has a key for the access device is performed. The key enables either the host operating system or the guest operating system to use the access device. A determination of whether the received request is an altering request to change a state of the access device or a passive request to read the access device is also performed. The processing of the request from the host and guest operating systems is similar except when the request is an altering request and neither the host operating system nor the guest operating system has the key. In this case, the request from the host operating system is passed and the request from the guest operating system is rejected.

46 Claims, 5 Drawing Sheets

METHOD AND APPARATUS FOR ALLOCATING USE OF AN ACCESS DEVICE BETWEEN HOST AND GUEST OPERATING SYSTEMS

BACKGROUND OF THE INVENTION

1. Field of the Invention

The invention relates to computers and computer software. More particularly, the invention relates to a method and apparatus for allocating use of an access device between a host operating system and a guest operating system.

2. Background of the Related Art

Every computer system is managed and implemented by its operating system. The operating system is responsible for a variety of functions including providing a user interface, coordinating use of memory, coordinating the use of devices coupled to the computer system, and managing the operating of various application programs.

However, there are situations where different computer systems need to share a common hardware or device. For example, different computer systems may need to share a common disk drive or a common printer. To implement the use of a common device or access device, some form of sharing mechanism or resource allocation is required among the computer systems.

In such a shared configuration, the use of the access device is managed by a host operating system within a particular computer system known as the host computer system. To enable the use the access device, the host operating system communicates with the operating systems of other computer systems known as guest computer systems. The operating system of these guest computer systems is known as a guest operating system.

One solution to implement sharing of the access device is to modify the host operating system. However, the host operating system generally comprises large, complex code that is difficult to change. Moreover, the modification of the host operating system would prevent a true sharing of a particular access device by a guest computer system operated by a guest operating system. Current implementations of the host and guest operating systems are monolithic with no support for the heterogeneous use of access devices. A problem occurs when the guest operating system may require access to a particular feature of the access device or hardware that is not supported by the host operating system.

Therefore, a need exists in the art to provide a solution that enables a guest computer system to use capabilities of an access device that is not necessarily supported by a host operating system.

SUMMARY OF THE INVENTION

Aspects of the invention provide a method, apparatus and article of manufacture for allocating use of an access device between a host operating system and a guest operating system. The allocation of the access device enables a guest computer system to use capabilities or features of the access device whether or not the capabilities are supported by a host operating system. In one embodiment, a source of the received request to use the access device is determined as either the host operating system or the guest operating system. A determination of whether the host or guest operating system has a key for the access device is performed. The key enables either the host operating system or the guest operating system to use the access device. A determination of whether the received request is altering request to change a state of the access device or a passive request to read the access device is also performed. The processing of the request from the host and guest operating systems may be similar except when the request is an altering request and neither the host operating system nor the guest operating system has the key. In this case, the request from the host operating system is accepted and the request from the guest operating system is rejected.

An apparatus comprising a memory, an access interface and a processor is also provided. The memory stores a sharing management program and the host operating system. The sharing management program communicates with the host operating system and a guest operating system. The processor, upon executing the sharing management program, is configured to determine a source of the received request as either the host operating system or the guest operating system. A determination of whether the host or guest operating system has a key for the access device is performed. The key enables either the host operating system or the guest operating system to use the access device. A determination of whether the received request is altering request to change a state of the access device or a passive request to read the access device is also performed. The processing of the request from the host and guest operating systems may be similar except when the request is an altering request and neither the host operating system nor the guest operating system has the key. In this case, the request from the host operating system is accepted and the request from the guest operating system is rejected.

In another embodiment, a computer readable medium storing a software program is provided. The software program, when executed by a computer, causes the computer to perform a method for allocating use of an access device between host and guest operating systems. A source of the received request to use the access device is determined as either a host operating system or a guest operating system. A determination of whether the host or guest operating system has a key for the access device is performed. The key enables either the host operating system or the guest operating system to use the access device. A determination of whether the received request is altering request to change a state of the access device or a passive request to read the access device is also performed. The processing of the request from the host and guest operating systems may be similar except when the request is an altering request and neither the host operating system nor the guest operating system has the key. In this case, the request from the host operating system is accepted and the request from the guest operating system is rejected.

BRIEF DESCRIPTION OF THE DRAWINGS

The teachings of the present invention can be readily understood by considering the following detailed description in conjunction with the accompanying drawings, in which.

DETAILED DESCRIPTION OF THE PREFERRED EMBODIMENT

Figure 1:
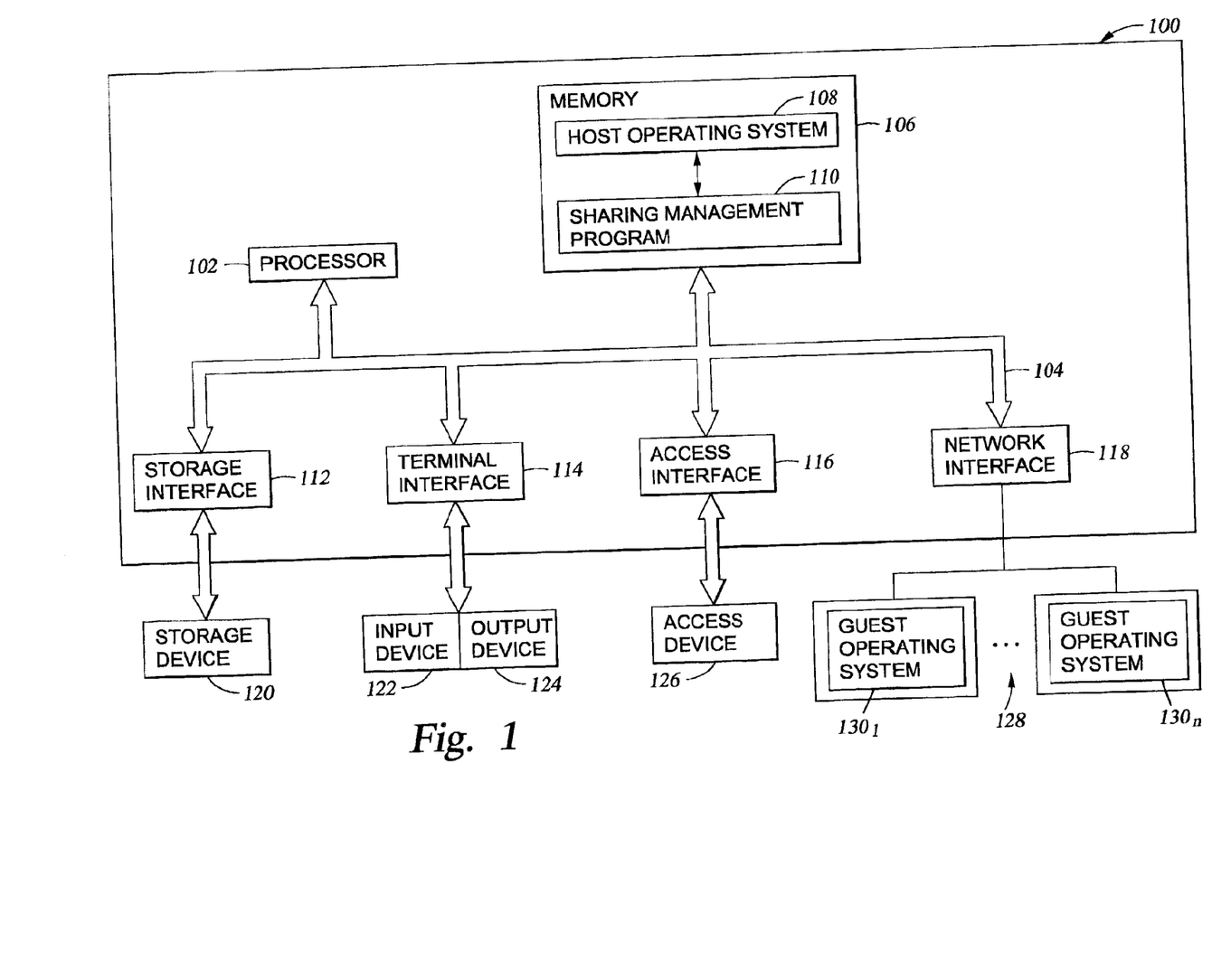
FIG. 1 depicts a block diagram of a computer system to implement the present invention.

FIG. 1 depicts an illustrative computer system 100. The computer system 100 may represent any type of computer, computer system or other programmable electronic device, including a client computer, a server computer, a portable computer, an embedded controller, and the like. The computer system 100 may be a standalone device or coupled to a computer network system. In one embodiment, the computer system 100 is an AS/400 available from International Business Machines of Armonk, N.Y.

In one embodiment, the computer system 100 is shown as a host computer system 100 in a multi-user programming environment having at least one processor 102, which obtains instructions and data from a main memory 106 via a bus 104. The main memory 106 includes a host operating system 108, a sharing management program 110, and various application programs (not shown). The main memory 106 may comprise one or a combination of memory devices, including Random Access Memory, nonvolatile or backup memory, (e.g., programmable or Flash memories, read-only memories, and the like). In addition, memory 106 may include memory physically located elsewhere in a computer system 100, for example, any storage capacity used as virtual memory or stored on a mass storage device or on another computer coupled to the computer system 100 via bus 104.

The computer system 100 is generally coupled to a number of peripheral devices. In one embodiment, the computer system 100 is coupled to a storage medium 120, input devices 122, and output devices 124, an access device 126 and at least one networked computer system 128. The storage medium 120 is coupled to the computer system 100 via a storage interface 112. The storage medium 120 may comprise either a permanent or removable direct access storage device (DASD). One example of the storage interface 112 is a disk drive, e.g., floppy drive, optical drive, tape backup, and the like.

The input devices 122 and output devices 124 are coupled to the computer system 100 via an input/output interface or terminal interface 114. The input devices 122 may comprise any device utilized to provide input to the computer system 100. Examples of input devices 122 include a keyboard, a keypad, a light pen, a touch screen, a button, a mouse, a track ball, a speech recognition unit, and the like. The output devices 124 may comprise any conventional display screen. Although shown separately from the input devices 122, the output devices 124 and input devices 122 could be combined. For example, a display screen with an integrated touch screen, and a display with an integrated keyboard, or a speech recognition unit combined with a text speech converter could be used.

The access device 126 is coupled to the computer system 100 via the access interface 116. One example of the access device 126 is a writeable DVD drive. However, the access device 126 may comprise any device that is accessible by the host computer system 100 and other networked computer systems 128. The access interface 116 coordinates the use of the access device 126 by either the computer system 100 or other networked computer systems 126. The access interface 116 converts a signal from the bus 104 into a format suitable for the access device 126 or an input/output (I/O) adapter coupled to the access device 126.

The computer system 100 illustratively coupled to at least one guest computer system. In one embodiment, the guest computer system a networked computer system 128 coupled to the (host) computer system 100 via a network interface 118. The operation of each guest computer system 128 is coordinated or managed by its respective guest operating system $130_1, \ldots, 130_n$ (generally referred herein as 130). The guest operating system 130 coordinates a request to enable the networked computer system 128 to use the access device 126 coupled to the host computer system 100. Examples of the guest operating system 130 may include IBM OS/400, UNIX, IBM AIX, Microsoft Windows, Windows NT, Linux and the like. The processing of this request from the guest operating system 130 is further described with respect to FIG. 5.

The host operating system 108 is the software utilized to operate the computer system 100. Examples of the host operating system 108 include IBM OS/400, UNIX, IBM AIX, Microsoft Windows, and the like. In one embodiment, the host operating system 108 also submits a request to use the access device 126. The processing of this request from the host operating system 108 is further described with respect to FIG. 4. The sharing management program 110 processes requests to use the access device 126 from both the host operating system 108 and the guest operating system 130. In processing these requests, the sharing management program 110 will either accept or reject a particular request from the host operating system 108 or the guest operating system 130. The accepted request is transmitted to the access interface 116. The rejected request is sent to the operating system 108 or 130 that sent the request to use the access device 126.

The sharing management program 110 implements sharing of the access device 126 while minimizing the intrusion to the host operating system 108. This limits the amount of modifications needed to the host operating system 108 to implement the sharing of the access device 116. The host operating system 108 only needs to interact with sharing management program 110, e.g., send a request or receive a rejected request. One embodiment to implement the sharing management program 110 is further described with respect to FIGS. 3–5.

Although the host operating system 108 and the guest operating system 130 are illustratively depicted in separate computer systems, i.e., the host computer system 100 and guest computer system 128, the host operating system 108 and the guest operating system 130 may also be in the same computer system. For example, a logically partitioned computer system may include both the host operating system 108 and the guest operating system 130. Additionally, the host operating system 108 and the guest operating system 130 may be of different types. In one embodiment, the host operating system 108 is an IBM OS/400 and the guest operating system 130 is a Microsoft Windows NT.

In general, the routines executed to implement the embodiments of the invention, whether implemented as part of an operating system or a specific application, component, program, object, module or sequence of instructions are in the sharing management program 110, or the program 110. The program 110 typically comprises one or more instructions that are resident at various times in various memory and storage devices in the computer system 100. When read and executed by one or more processors 102 in the computer system 100, the program 110 causes that computer system 100 to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing or computer readable media used to actually carry out the distribution. Examples of signal bearing or computer readable media include, but are not limited to, recordable type media such as volatile and nonvolatile memory devices, floppy and other removable disks, hard disk drives, optical disks (e.g., CD-ROM, DVD, and the like), among others.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

Figure 2:
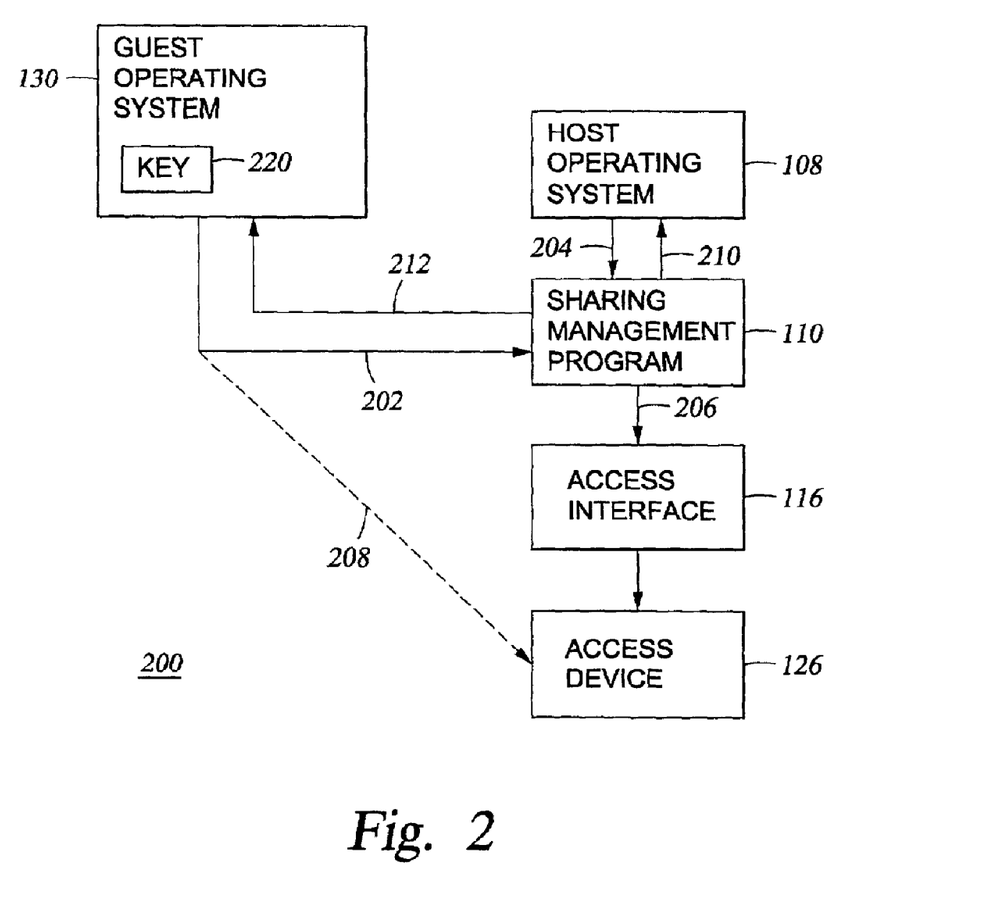
FIG. 2 depicts a process diagram for components of the computer system of FIG. 1.

FIG. 2 depicts a process diagram 200 for components of the integrated computer system 100 of FIG. 1. Specifically, the process diagram 200 illustrates the signals and data structures transmitted between the host operating system 108, the sharing management program 110 and the guest operating system 130. Although one guest operating system 130 will be described below, the process diagram 200 likewise applies to situations where multiple guest operating systems 130 request the use of the access device 126.

The sharing management program 110 receives a request from the guest operating system 130 via path 202 and/or a request from the host operating system via path 204. The request via path 202 is a request to use the access device 126 by the guest computer system 128. The request via path 204 is a request to use the access device 126 by the host computer system 100. The guest operating system 130 is logically linked to the access device 126 via path 208. However, the guest operating system 130 is unaware of the sharing management program 110 or the access interface 116.

The request from the guest operating system 130 via path 202 may include capabilities not supported by the host operating system 108. For example, a particular access device 126 may implement a variety of capabilities or functions. A host operating system 108 may support the use of a limited number, i.e., a subset, of these capabilities. Another guest operating system 108 may support the use of different capabilities. Since the host operating system 108 and the guest operating system 130 may be monolithic with no support for the heterogeneous use of the access device 130, a separate program 110 is used to process the requests from the host operating system 108 and the guest operating system 130. This enables the guest computer system 128 to use capabilities of the access device 126 that the host operating system 108 does not support.

The sharing management program 110 processes these requests to determine whether the host computer system 100 or the guest computer system 128 may use the access device 126. In one embodiment, the request may comprise a "passive" request or an "altering" request. The passive request comprises a request to use but not change the state of the access device 126. In contrast, the altering request comprises a request that may require a change of the state of the access device 126. One example of a passive request is a read of data from the access device 126. An active request may comprise a write to the access device 126 or an alteration of the microcode of the access device 126. The processing of such requests is further described with respect to FIGS. 3–5.

To determine whether to accept or reject a particular request, the sharing management program 110 uses a "key" 220 to track the use of the access device 126 by a particular computer system, e.g., the host computer system 100 and the guest computer system 128. A particular computer system may use the access device 126 if its corresponding operating system has the key 220. One embodiment of the key 220 is a data structure. Illustratively, the guest operating system 130 has the key 220. Once the computer system, e.g., the guest computer system 128, completes use of the access device 126, the key 220 is removed or otherwise expired from the operating system 130. This enables the use of the device 126 by another operating system.

In one embodiment, the operating system, e.g., the guest operating system 130, having the key 220 may send a request to release control of the key 220. In response to such a request, the sharing management program 110 releases the key 220 from the requesting operating system and sends a reset signal to all operating systems. One form of the reset signal is a "simulated media change signal". The operating systems process the signal as an actual change of the access device 126 and reset its cache. This enables memory or cache synchronization.

If the sharing management program 110 accepts or approves a particular request to use the access device 126, the accepted request is passed to the access interface 116 via path 206. One embodiment of the request is a SCSI (Small Computer System Interface) command from the guest operating system 130, e.g., Microsoft Windows. The SCSI command may comprise audio commands not supported by the host operating system 108, e.g., IBM AS/400. Examples of such audio commands include PAUSE/RESUME, PLAY AUDIO TRACK/INDEX, PLAY AUDIO(12) and PLAY AUDIO (10). The two different types of PLAY AUDIO commands are specified with the number of bytes in the command, e.g., 10 or 12 bytes. These audio commands from the guest operating system 130 enables a user of a guest computer system 128 use the access device 126, e.g., a DVD drive or CD player, that is not supported by the host operating system 108.

The access interface 116 converts the passed request into a format suitable for the access device 126 or an I/O adapter coupled to the access device 126. As such, the access interface 116 coordinates the use of the access device 126 by either the host computer system 100 or the guest computer system 128.

If the sharing management program 110 rejects the request, the operating system that provided the request is notified of the rejection. The rejection may be a signal sent to the host operating system 108 via path 210 or the guest operating system 130 via path 212. One form of the rejection signal is a bad code signal. The bad code signal indicates the access device 126 is currently used by an operating system other than the one making the request.

Figure 3:
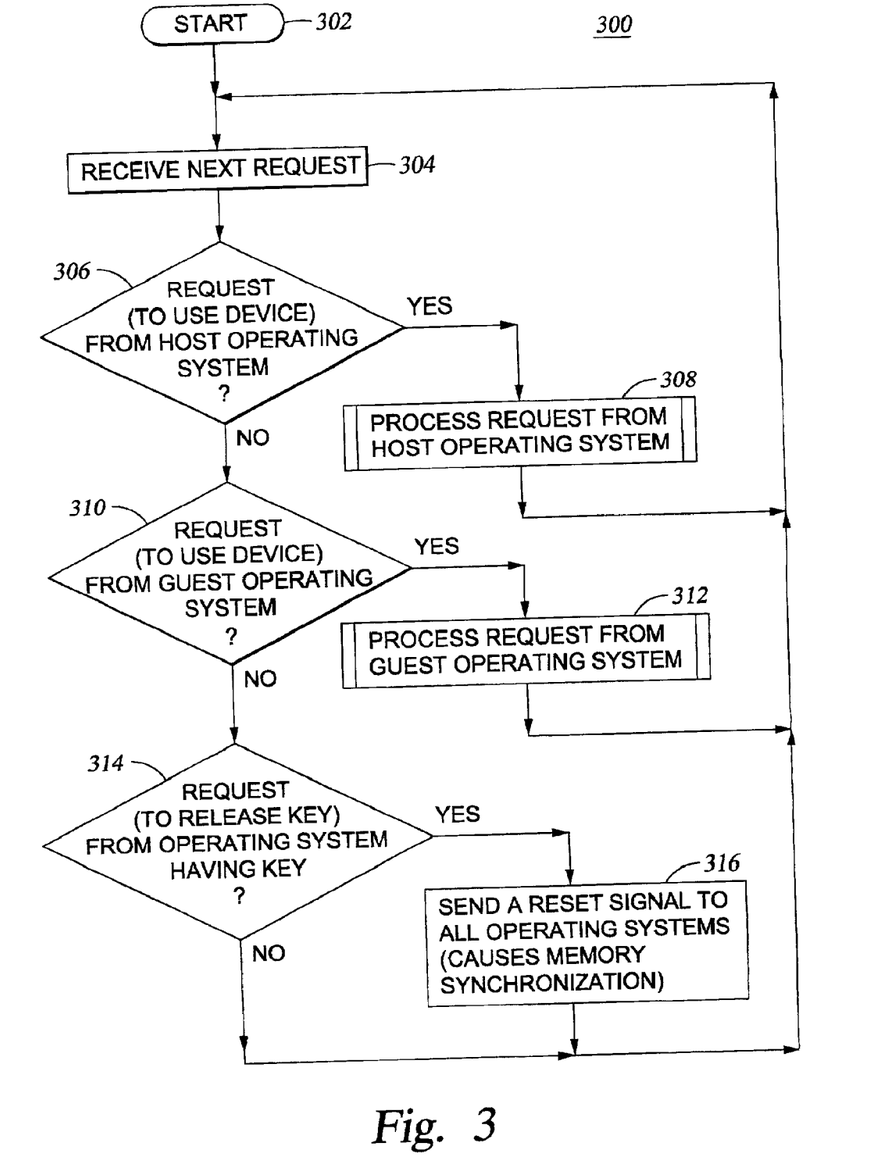
FIG. 3 depicts a flow diagram of a method as embodied in a sharing management program.

FIG. 3 depicts a flow diagram of a method 300 as embodied in a sharing management program 110. Specifically, the method 300 starts at step 302 and proceeds to step 304 where a request is received. At step 306, a query determines whether the request is from the host operating system 108 for the computer system 100 to use the access device 126. If the request is from the host operating system 108, the method 300 proceeds to process the request at step 308 and to receive the next request at step 304. One embodiment of step 308 is further described with respect to FIG. 4.

If the request is not from the host operating system 108, the method 300 proceeds to step 310 where a query determines whether the request is from the guest operating system 130 for the guest computer system 128 to use the access device 126. Step 310 may be repeated for the guest operating system 130 of each networked computer system 128. If the request is from the guest operating system 130, the method 300 proceeds to process the request at step 312 and to receive the next request at step 304. One embodiment of step 312 is further described with respect to FIG. 5.

If the request is not from the guest operating system 130, the method 300 proceeds to step 314 where a query determines whether there is a request to release the key 220 from an operating system having the key 220. Step 314 applies to a request from both the host operating system 108 and the guest operating system 130. If there is no request at step 314, the method 300 proceeds to process the next request at step 304.

If there is a request at step 314, the method 300 proceeds to step 316 where the key 220 is released from the requesting operating system and a reset signal, e.g., a "simulated media change signal", is sent to all the operating systems interacting with the program 110. The signal is used to notify the operating systems of the current state of the access device 126. Changes in the state of the access device 126 may have occurred if an altering request was previously granted to a host operating system 108 or a guest operating system 130.

The "simulated media change" signal forces all the operating systems to "believe" that a change in the media 126 will occur, even though there is generally no change of the access media 126. In response to the simulated media change signal, cache or memory synchronization is performed. Namely, each operating system clears the cache or other memory associated its associated computer system. For example, the host operating system 108 would clear the cache within the memory 106, while the guest operating system 130 would clear the cache in the guest computer system 128. In one embodiment, the cache is cleared of all information of the past state of the access device 126 and refreshed with new information.

Depending on the particular type of access device 126, step 316 may provide other forms of the reset signal to the operating systems. For example, if the access device 126 is a printer, the step 316 may send another type of reset signal. Upon receipt of such a signal, the operating systems may initiate operations on the printer, e.g., ejecting a page or signaling a change of a form.

Although the method 300, and in particular steps 310 and 312, is described in the context of one guest operating system 130, the method 300 applies for all guest operating systems 130$_1$, . . . , 130$_n$ used to manage each networked computer system 128.

Figure 4:
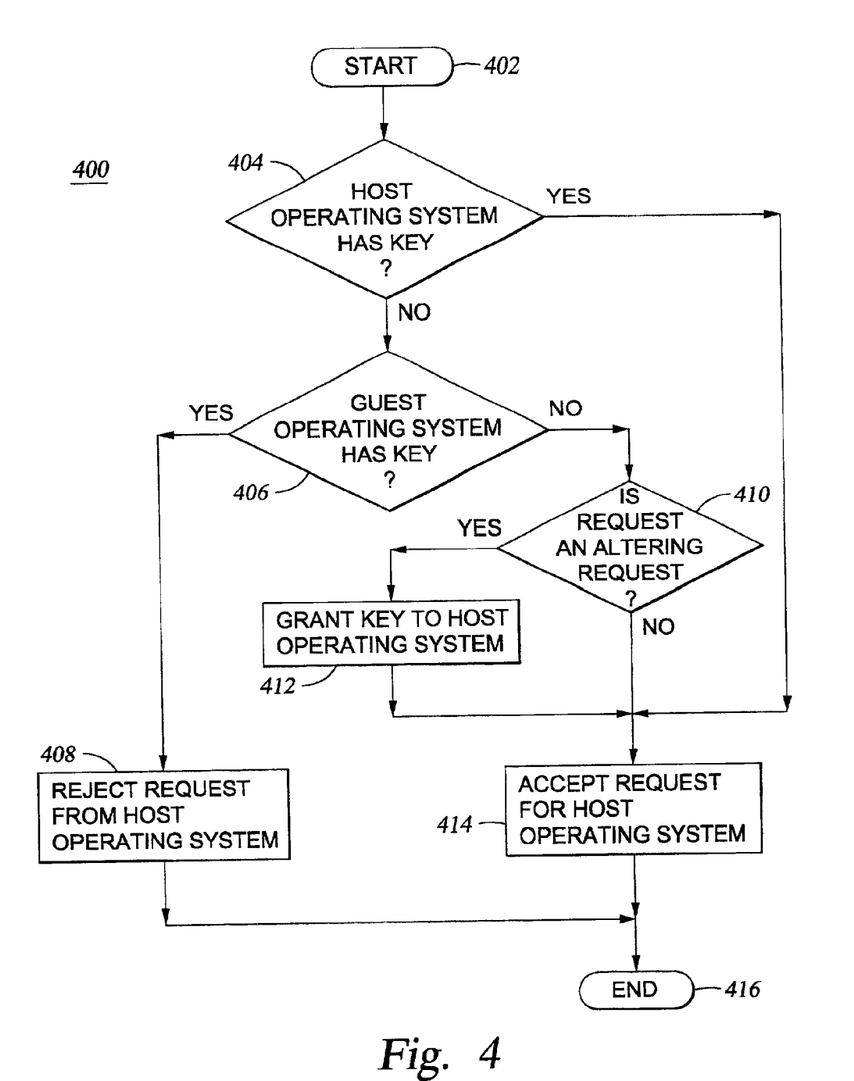
FIG. 4 depicts a flow diagram of a method for processing a request from a host operating system.

FIG. 4 depicts a flow diagram of a method 400 for processing a request from the host operating system 108. The method 400 is embodied as step 308 described above with reference to FIG. 3. Specifically, the method 400 starts at step 402 and proceeds to step 404 where a query determines whether the host operating system 108 has a "key" 220. The key 220 enables the host computer system 100 to use the access device 126, e.g., a writable DVD drive. If an operating system 108 has the key 220 for the access device 126, then the access device is considered as being "locked" to the operating system 108.

If the host operating system 108 has the key 220 at step 404, the method 400 proceeds to step 414. If the host operating system 108 does not have the key 220, the method 400 proceeds to step 406 where a query determines whether the another, i.e., guest, operating system 130 has the key 220. Namely, step 406 determines whether the access device 126 is locked by the guest operating system 130. If another operating system, i.e., guest operating system 130, has the key 220, the method 400 proceeds to reject the request and notify the rejection to the host operating system 108 at step 408. One form of rejection is a bad return code via path 210. The reason for the rejection is that the access device 126 is currently locked or used by the guest operating system 130. After step 408, the method 400 ends at step 416.

If another operating system, e.g., guest operating system 130, also does not have the key 220, the method 400 proceeds to step 410. Step 410 determines whether the request is an altering request, i.e., a request to alter the media of the access device 126. If the request is an altering request, the method 400 proceeds to grant the key 220 to the host operating system 108 at step 412. Namely, step 412 will implicitly lock the access device 126 to the host operating system 108. Once locked, the guest operating system 130 may not use the device 126 unless the key 200 is relinquished or expired. After step 412, the method 400 proceeds to step 414.

If the request is not an altering request, e.g., a passive request, the method 400 proceeds to step 414. In this situation, both the host operating system 108 and the guest operating system 130 may still use the device 126, since neither the host operating system 108 nor the guest operating system 130 has the key 220. Another embodiment of the method 400 may grant the key 220 to the host operating system 108 at step 410 regardless of whether the request is an altering request. At step 414, the method 400 accepts the request. After step 414, the method 400 ends at step 416.

The accepted request from step 414 is passed to the access interface 116. The access interface 116 performs device management functions on the passed request received via path 206. In one embodiment, the device management functions include the conversion of the request into a format suitable for processing by an I/O adapter coupled to the access device 126.

Figure 5:
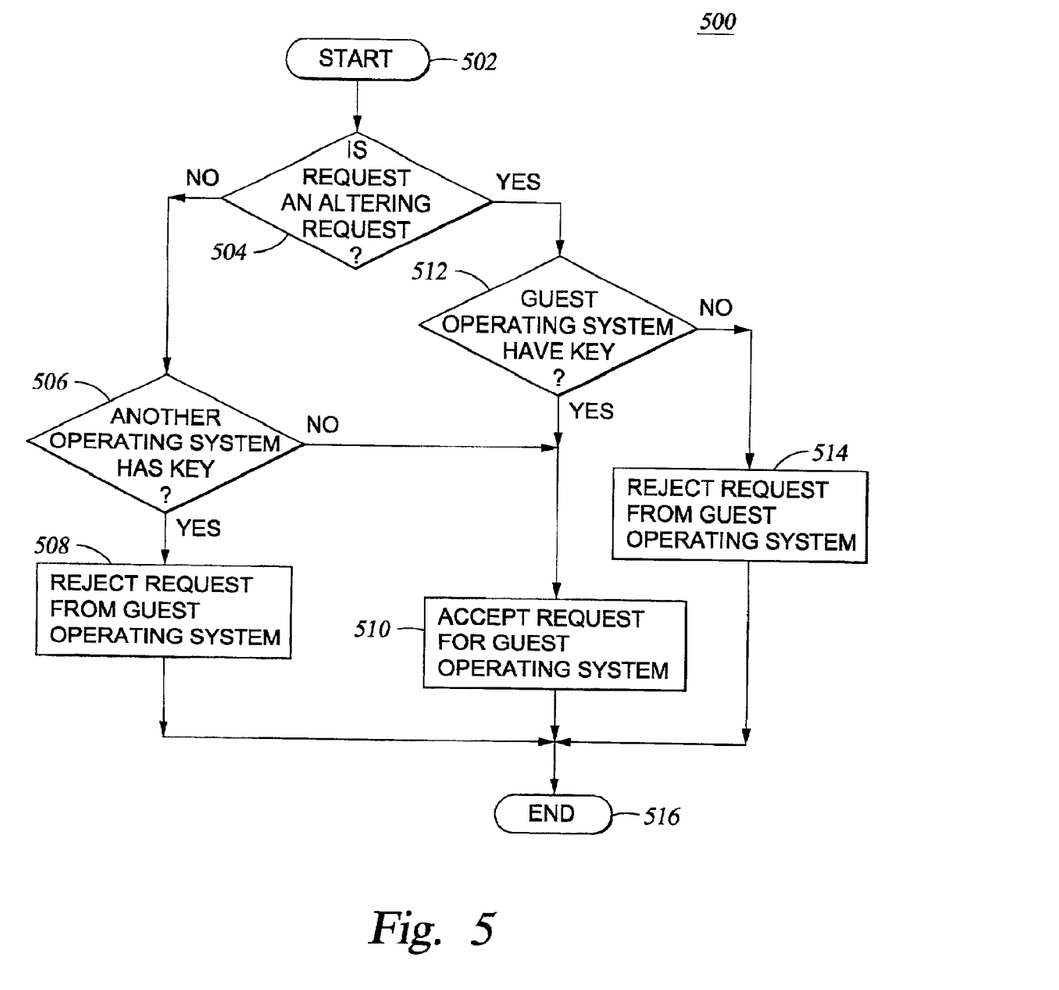
FIG. 5 depicts a flow diagram of a method for processing a request from a guest operating system.

FIG. 5 depicts a flow diagram of a method 500 for processing a request from the guest operating system 130. The method 500 is embodied as step 312 described above with reference to FIG. 3. Although the method 500 is described in the context of one guest operating system 130, the method 500 applies for all guest operating systems 130$_1$, . . . , 130$_n$ used to manage each networked computer system 128.

Note that the request from the guest operating system 130 in FIG. 5 may be processed similarly to the request from the host operating system 108 in FIG. 3. The main difference occurs when the request is an altering request and neither the host operating system 108 nor the guest operating system 130 has the key 220. In this case, the request from the host operating system 108 is accepted and the request from the guest operating system 130 is rejected.

Specifically, the method 500 starts at step 502 and proceeds to step 504 where a query determines whether the request from the guest operating system 130 is an altering request to change the state of the device 126. If the request is not an altering request, the method 500 proceeds to step 506 where a query determines whether another operating system has the key 220. Namely, step 506 determines whether the access device 226 is locked by another operating system, i.e., the host operating system 108 or some other guest operating system 130.

If another operating system has the key 220, the method 500 proceeds to step 508 where the request is rejected. The guest operating system 130 is notified of this rejection via path 212. The reason for the rejection is that the access device 126 is currently locked or used by another operating system, i.e., the host operating system 108 or some other guest operating system 130. After step 508, the method 500 ends at step 516. If another operating system does not have the key 220, the method 500 proceeds to step 510 where the request is accepted. In another embodiment, the method 500 may also provide the key 220 to the guest operating system 130 prior to step 510. After step 510, the method 500 ends at step 516.

Returning to step 504, if the request is an altering request, the method 500 proceeds to step 512 where a query determines whether the requesting guest operating system 130 has the key 220. The key 220 enables the guest computer system 128 to have exclusive use of the access device 126 via the guest operating system 130. After the use of the access device 126, the key 220 is relinquished or released from the guest operating system 130. As such, the use of the access device 126 via the guest operating system 130 is "transient" in nature since another operating system, e.g., a host operating system 108 or another guest operating system 130 may use the access device 126 after the key 220 is released.

If the guest operating system 130 does not have the key 220, the method 500 proceeds to reject the request and notify the guest operating system at step 514. The reason for the rejection is that an altering request from the guest operating system 130 is rejected unless the guest operating system 130 has the key 220. After step 514, the method 500 ends at step 516. If the guest operating system 130 has the key 220, the method 500 proceeds to accept the request to the access interface 116 at step 510 and ends at step 516.

The accepted request from step 510 is passed to the access interface 116. The access interface 116 converts the passed request into a format suitable for processing by an I/O adapter coupled to the access device 126. The conversion may include the placement of a transport "wrapper" around the request. The conversion may be conceptually similar to the device management function for the request from the host operating system in FIG. 4, but may involve more detailed processing to convert the request from the guest operating system 130.

Although various embodiments which incorporate the teachings of the present invention have been shown and described in detail herein, those skilled in the art can readily devise many other varied embodiments that still incorporate these teachings.

What is claimed is:

1. A method for allocating use of an access device between a host operating system and a guest operating system, the method comprising:
    determining whether a received request to use the access device is from the host operating system;
    determining whether one of the host operating system and the guest operating system has a key for the access device, where the key enables one of the host operating system and the guest operating system to use the access device;
    determining the request as one of an altering request to change a state of the access device and a passive request to read the access device;
    accepting the request from the host operating system, if the request is an altering request from the host operating system and neither the host operating system nor the guest operating system has the key; and
    rejecting the request from the guest operating system, if the request is an altering request from the guest operating system and neither the host operating system nor the guest operating system has the key.

2. The method of claim 1 further comprising:
    accepting the request from whichever of the host operating system and the guest operating system has the key.

3. The method of claim 2 wherein the guest operating system releases the key after use of the access device to enable a transient use of the access device.

4. The method of claim 1 further comprising:
    rejecting, if one of the host operating system and the guest operating system has the key, the request from the other operating system.

5. The method of claim 1 further comprising:
    accepting the request from one of the host operating system and the guest operating system, if the request is a passive request and neither the host operating system nor the guest operating system has the key.

6. The method of claim 1 wherein the request is passed to an access interface coupled to the access device.

7. The method of claim 6 wherein the access interface converts the passed request into a format suitable for the access interface.

8. The method of claim 6 wherein the access interface comprises an input/output (I/O) adapter and the access device comprises a writable disk drive.

9. The method of claim 6 wherein the passed request comprises a SCSI (Small Computer System Interlace) command.

10. The method of claim 9 wherein the SCSI command comprises one of a PAUSE/RESUME command, a PLAY AUDIO(10) command, a PLAY AUDIO(12) command and a PLAY AUDIO TRACK/INDEX command.

11. The method of claim 1 wherein the host operating system and the guest operating system are of different types.

12. The method of claim 1 wherein at least one of the host operating system and the guest operating system is one of OS/400, Linux, UNIX, AIX, Microsoft Windows, and Windows NT.

13. The method of claim 1 wherein the access device is considered locked to a particular operating system if the particular operating system has the key, where the particular operating system is one of the host operating system and the guest operating system.

14. The method of claim 1 further comprising:
    determining whether a received request to release the key is from one of the host operating system and the guest operating system having the key;
    releasing the key from the one of the host operating system and the guest operating system having the key;
    sending a reset signal to the host operating system and the guest operating system, where the reset signal causes the host operating system and the guest operating system to reset a state of an associated cache memory.

15. The method of claim 14 wherein the reset signal simulates a change of the access device.

16. The method of claim 1 wherein the request from the guest operating system is for a capability of the access device that is supported by the guest operating system and unsupported by the host operating system.

17. The method of claim 1, wherein the method is performed by a sharing manager in communication with the host and guest operating systems.

18. A method for allocating use of an access device between a host operating system and a guest operating system, the method comprising:
   receiving a request from the guest operating system;
   determining whether the guest operating system has a key for the access device, where the key enables one of the host operating system and the guest operating system to use the access device;
   determining whether the host operating system has the key;
   determining the request as one of an altering request to change a state of the access device and a passive request to read the access device,
   accepting the request from the guest operating system, if the request is passive request from the guest operating system and neither the host operating system nor the guest operating system has the key; and
   rejecting the request from the guest operating system, if the request is an altering request from the guest operating system and neither the host operating system nor the guest operating system has the key.

19. The method of claim 18 further comprising:
   accepting the request from the guest operating system, if the key is found with the guest operating system; and
   rejecting the request from the guest operating system, if key is found with another operating system.

20. The method of claim 19 wherein the another operating system comprises on of a host operating system and another guest operating system.

21. An apparatus for allocating use of an access device between a host operating system and a guest operating system, the apparatus comprising:
   a memory for storing a sharing management program and the host operating system, where the sharing management program communicates with the host operating system and the guest operating system; and
   a processor to execute, the sharing management program which is configured to:
      determine whether a received request to use the access device is from the host operating system;
      determine whether one of the host operating system and the guest operating system has a key for the access device, where the key enables one of the host operating system and the guest operating system to use the access device;
      determine the request as one of an altering request to change a state of the access device and a passive request to read the access device,
      accept the request from the host operating system, if the request is an altering request from the host operating system and neither the host operating system nor the guest operating system has the key; and
   reject the request from the guest operating system, if the request is an altering request from the guest operating system and neither the host operating system nor the guest operating system has the key.

22. The apparatus of claim 21 further comprising:
   an access interface for converting the accepted request into a format suitable for the access device.

23. The apparatus of claim 21 wherein the access device comprises a writable disk drive and is coupled to the access interface via an input/output (I/O) adapter.

24. The apparatus of claim 23 wherein the accepted request is sent to the access interface as a SCSI (Small Computer System Interface) command.

25. The apparatus of claim 24 wherein the SCSI command comprises one of a PAUSE/RESUME command, a PLAY AUDIO(10) command, a PLAY AUDIO(12) command and a PLAY AUDIO TRACK/INDEX command.

26. The apparatus of claim 21 wherein the host operating system and the guest operating system are of different types.

27. The apparatus of claim 21 wherein at least one of the host operating system and the guest operating system is one of OS/400, Linux, UNIX, AIX, Microsoft Windows, and Windows NT.

28. The apparatus of claim 21 wherein the host operating system and the guest operating system are part of a logically partitioned system.

29. The apparatus of claim 21 wherein the host operating system and the guest operating system are contained in separate computer systems.

30. The apparatus of claim 21 wherein the request from the guest operating system is for a capability of the access device that is supported by the guest operating system and unsupported by the host operating system.

31. A computer readable medium storing a software program that, when executed by a computer, causes the computer to perform an operation of allocating use of an access device between a host operating system and a guest operating system, the operation comprising:
   determining whether a received request to use the access device is from the host operating system;
   determining whether one of the host operating system and the guest operating system has a key for the access device, where the key enables one of the host operating system and the guest operating system to use the access device;
   determining the request as one of an altering request to change a state of the access device and a passive request to read the access device,
   accepting the request from the host operating system, if the request is an altering request from the host operating system and neither the host operating system nor the guest operating system has the key; and
   rejecting the request from the guest operating system, if the request is an altering request from the guest operating system and neither the host operating system nor the guest operating system has the key.

32. The computer readable medium of claim 31 wherein the method further comprises:
   accepting the request from whichever of the host operating system and the guest operating system has the key.

33. The computer readable medium of claim 32 wherein the guest operating system releases the key after use of the access device to enable a transient use of the access device.

34. The computer readable medium of claim 31 wherein the method further comprises:
   rejecting, if one of the host operating system and the guest operating system has the key, the request from the other operating system.

35. The computer readable medium of claim 31 wherein the method further comprises:
   accepting the request from one of the host operating system and the guest operating system, if the request is a passive request and neither the host operating system nor the guest operating system has the key.

36. The computer readable medium of claim 31 wherein the request is passed to an access interface coupled to the access device.

37. The computer readable medium of claim 36 wherein the access interface converts the passed request into a format suitable for the access device.

38. The computer readable medium of claim 36 wherein the access interface comprises an input/output (I/O) adapter and the access device comprises a writable disk drive.

39. The computer readable medium of claim 36 wherein the passed request comprises a SCSI (Small Computer System Interface) command.

40. The computer readable medium of claim 39 wherein the SCSI command comprises one of a PAUSE/RESUME command, a PLAY AUDIO(10) command, a PLAY AUDIO (12) command and a PLAY AUDIO TRACK/INDEX command.

41. The computer readable medium of claim 31 wherein the host operating system and the guest operating system are of different types.

42. The computer readable medium of claim 31 wherein at least one of the host operating system and the guest operating system is one of OS/400, Linux, UNIX, AIX, Microsoft Windows, and Windows NT.

43. The computer readable medium of claim 31 wherein the access device is considered locked to a particular operating system if the particular operating system has the key, where the particular operating system is one of the host operating system and the guest operating system.

44. The computer readable medium of claim 31 wherein the method further comprises:

determining whether a received request to release the key is from one of the host operating system and the guest operating system having the key;

releasing the key from the one of the host operating system and the guest operating system having the key;

sending a reset signal to the host operating system and the guest operating system, where the reset signal causes the host operating system and the guest operating system to reset a state of an associated cache memory.

45. The computer readable medium of claim 44 wherein the reset signal simulates a change of the access device.

46. The computer readable medium of claim 31 wherein the request from the guest operating system is for a capability of the access device that is supported by the guest operating system and unsupported by the host operating system.

* * * * *